United States Patent [19]

Frerking

[11] Patent Number: 4,942,290

[45] Date of Patent: Jul. 17, 1990

[54] DISPENSING MACHINE HAVING HORIZONTAL PRODUCT CARRIER MOVABLE THROUGH AN ELLIPTICAL-TYPE PATH

[75] Inventor: David R. Frerking, Des Moines, Iowa

[73] Assignee: Fawn Engineering Corp., Des Moines, Iowa

[21] Appl. No.: 291,004

[22] Filed: Dec. 27, 1988

[51] Int. Cl.[5] ............................................ G06F 7/08

[52] U.S. Cl. .................................... 235/381; 235/375

[58] Field of Search ............................. 235/381, 375

[56] References Cited

U.S. PATENT DOCUMENTS

| | | | |
|---|---|---|---|
| 3,539,072 | 11/1970 | Hunter et al. . | |
| 3,556,284 | 1/1971 | Dyer et al. . | |
| 3,770,105 | 11/1973 | O'Neal . | |
| 4,598,840 | 7/1986 | Shore .............................. | 235/381 |

*Primary Examiner*—Harold I. Pitts

*Attorney, Agent, or Firm*—Henderson & Sturm

[57] ABSTRACT

A dispensing machine having a cabinet; an endless, upright conveyor mounted within the cabinet and having an elliptical-type shape with opposed vertical stretches; a dispensing station formed on a housing for the cabinet and disposed adjacent one of the vertical stretches of the conveyor; a plurality of product carriers each of which has support devices formed on opposite ends thereof; a plurality of arms, each arm mounting a carrier on the conveyor and enabling movement of the carriers in succession past the station; a stabilizer unit rotatably connected to each mounting arm and having a follower, the stabilizer unit adapted to receive the support devices; and a pair of horizontally offset elliptical-type guidepaths with vertical stretches extended parallel the vertical stretches of the conveyor. The dispensing machine comprises further a carrier sensing device mounted on the cabinet for interacting with a cost identification unit mounted on each carrier.

14 Claims, 5 Drawing Sheets

DISPENSING MACHINE HAVING HORIZONTAL PRODUCT CARRIER MOVABLE THROUGH AN ELLIPTICAL-TYPE PATH

TECHNICAL FIELD

This invention relates to vending machines of the class commonly referred to as general merchandisers. Machines of this type allow a prospective customer to "shop" for a desired product by actuating the product conveyor of the machine to bring carriers holding products in succession past a display window. The customer may then stop the conveyor when his product choice moves into registration of the dispensing station, whereupon deposit of the required credit enables the customer to remove his choice from the machine. The product conveyor moves the carriers holding the product in an elliptical-type path having horizontally spaced vertical stretches of travel.

BACKGROUND ART

Manifestly, it is extremely desirable for reasons of efficiency that the machine carry the maximum inventory possible within its space limitations. To this end, the product carriers secured to the conveyor of the machine follow a rectangular or elliptical path of travel with vertical parallel stretches and rounded corners which conform as closely as possible to the dimensions of the product cabinet. In this manner the carriers may be disposed in close proximity to one another on the conveyor without interfering with each other during changes of directions at the limits of the conveyor. A number of control problems have existed in the past, and continue to exist since the carriers must be allowed to remain horizontal relative to the conveyor. Since the machine may be required to handle items which would be disturbed when upset, the item supporting surfaces of the carrier must be maintained in planes that do not depart substantially from the horizontal as the carriers move through the upper and lower limits of their travel.

One attempt to solve such control problems is shown in U.S. Pat. Nos. 3,556,284 and 3,770,105 wherein support arms are secured to a carrier, the arms requiring followers which are pivotally connected to the carriers and move longitudinally within slots formed within each arms while maintaining an engagement with an elliptical-type track. Engagement of each carrier with either bias mechanism mounted at the top and base of the cabinet, or with the top and base themselves, however, is necessary to ensure non-tilting of the carriers as they move through the upper and lower reaches of the path.

Another attempt involved carriers mounted at opposite ends in a pivotal manner at opposed locations below the center of gravity of the carriers whereupon the carriers continually tended to roll over and bind against each other particularly at the rounded corners of the elliptical path, due partly to gravity working against the stability of the carriers.

It is to the elimination of such problems that this invention is directed, including the provision of improved product carrier sensing for displaying cost and to improved cabinet support in servicing position.

DISCLOSURE OF THE INVENTION

A dispensing machine having a cabinet; an endless, upright conveyor mounted within the cabinet and having an elliptical shape with opposed vertical stretches; a dispensing station formed in a housing for the cabinet and disposed adjacent one of the vertical stretches of the conveyor; a plurality of product carriers each of which has support devices formed on opposite ends thereof; a plurality of arms, each arm mounting a carrier on the conveyor and enabling movement of the carriers in succession past the station; a stabilizer unit rotatably connected to each mounting arm and having a follower, the stabilizer unit adapted to receive the support devices; and a guide track assembly including a pair of horizontally offset elliptical guidepaths with vertical stretches extended parallel the vertical stretches of the conveyor, the follower of each stabilizer unit engaged in a respective elliptical guidepath and whereby the support devices of each carrier are mounted at respective ends of each carrier such that the opposite followers are laterally offset the same distance of the elliptical guidepaths, whereby the carriers are maintained in a generally horizontally disposed position for receiving and holding product.

The dispensing machine comprises further a carrier sensing device mounted on the cabinet for interacting with a product identification unit mounted on each carrier such that the product price of each carrier is displayed as each carrier moves into a proximate position relative to the sensing device.

An object of the present invention is to provide an improved dispensing or vending machine having a conveyor with product carriers supported thereon wherein the carriers are advanced in a substantially elliptical path of travel having straight, vertical stretches and rounded corners for maximum product capacity, and wherein the product carriers are positively controlled at all times and during change of direction around such corners to maintain a horizontal position of the carriers.

Another object of the present invention is to provide a machine of the aforesaid variety wherein control of the carriers against tipping is accomplished along straight stretches of the path of travel of the carriers as well as around the corners thereof through the provision of support arms secured to the conveyor, stabilizers rotatably connected to the support arms, and support devices mounted on opposed ends of each carrier for releasable engagement with the stabilizers.

Yet another object of the present invention is the provision of a pair of elliptical-type tracks for the carriers as aforesaid which tracks are horizontally offset to maintain the carriers in their proper horizontal disposition.

Still another object of this invention is to provide a pair of elliptical-type, horizontally offset tracks, each track at opposed sides of the cabinet, and with stabilizer units mounted on opposed support devices at opposed ends of each product carrier, the stabilizer units each having a follower offset from an opposed follower, with the opposed offset followers engaged within the offset tracks whereby to maintain the carriers in their horizontal position.

Another object is to provide a unique product carrier sensing arrangement at the rear of the cabinet in proximate location to a carrier thereat for displaying the cost of the product carrier viewable at the dispensing station.

Yet another object of this invention is the provision of a support for the cabinet when the latter is rolled out of the housing for servicing purposes, and which support is readily stowable within the housing, and also supported on the cabinet in a floor engaged position for supporting a carrier or the like.

It is another object of this invention to provide such an article dispensing machine which is simple and rugged, easy to manufacture, effective in operation and with a cabinet easily removable for servicing.

BRIEF DESCRIPTION OF THE DRAWINGS

These and other objects of the invention will become more clear upon a thorough study and review of the following detailed description of the preferred embodiment for carrying out the invention, particularly when reviewed in conjunction with the accompanying drawings, wherein.

BEST MODE FOR CARRYING OUT THE INVENTION

Figure 1:
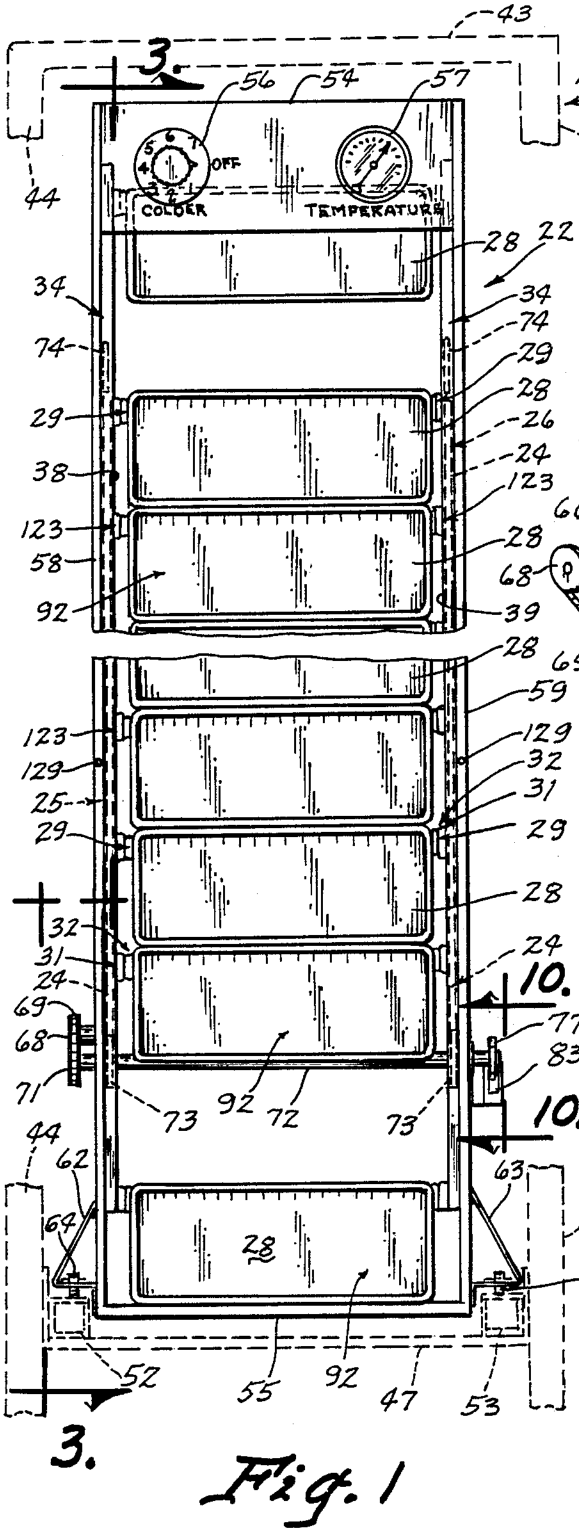
FIG. 1 is a front elevational view of an upright cabinet of the vending machine of this invention showing a plurality of product carriers movably mounted on endless conveyors, parts of the housing of the machine shown in dotted lines.
Figure 7:
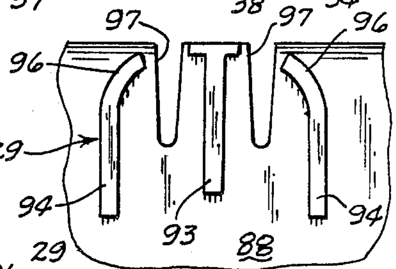
FIG. 7 is an enlarged detail, fragmentary view taken along the line 7—7 in FIG. 6.

Referring now to the drawings, the dispensing machine (20) (FIGS. 1 and 2) of this invention comprises generally a housing (21) (FIGS. 12 and 13); a rectangular cabinet (22); a conveyor assembly (23) (FIG. 2) having a pair of endless, upright conveyor chains (24) mounted within the cabinet and having opposed vertical stretches (25) and (26); a dispensing station (27) (FIG. 3) disposed adjacent one of the vertical stretches (26); a plurality of product carriers (28) (FIGS. 3 and 6), each carrier (28) having support units (29) (FIGS. 6 and 7) mounted on opposed ends thereof; mounting units (31) (FIGS. 4 and 5) mounting the carriers (28) on the conveyor chains (24) for movement in succession past the dispensing station (27) upon operation of the conveyor assembly (23); stabilizer devices (32) (FIGS. 4 and 5) rotatably connected to the mounting units (31) and including a follower (33) secured thereon, the support units (29) releasably connected to the stabilizer devices (32); and a guide track assembly (34) (FIGS. 14 and 15) including a pair of elliptical-type guidepaths (36), (37) each formed respectively in a guide plate (38), (39), with each guidepath (36), (37) having vertical stretches (41), (41') and (42), (42'), respectively, extended parallel the vertical stretches (25), (26) of the conveyor assembly (23), the follower (33) of each stabilizer device (32) engaged in at least one of the guidepaths (36), (37) whereby the carriers (28) are maintained in a generally horizontally disposed position for receiving and holding product (not shown).

Figure 9:
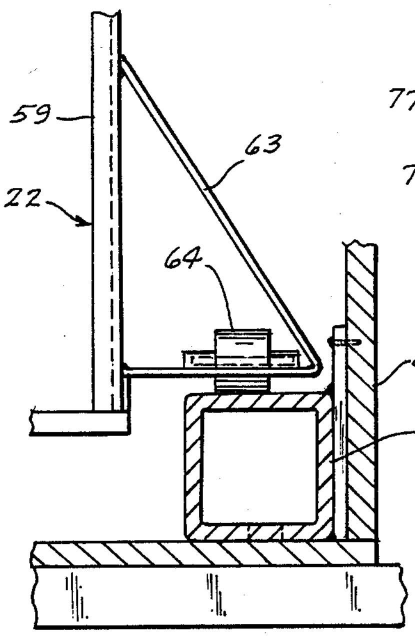
FIG. 9 is an enlarged sectional view taken along the line 9—9 in FIG. 3.

More particularly, the housing (21) comprises a top (43) (FIGS. 1 and 12), laterally spaced side walls (44), (46), a base (47) with legs (48) (FIG. 12) mounted thereon for supporting the housing (21) on a floor (49). The housing (21) comprises further an outwardly swingable door (50) hingedly connected to one side wall of the housing, and having a rectangular glass window (51) inserted therein substantially the entire dimension of the door (50). A pair of elongated tubular elements (52), (53) (FIGS. 1 and 9) are mounted on laterally spaced sides of the floor (49) for a purpose hereinafter described.

The cabinet (22) includes a top portion (54) (FIG. 1) to which temperature controls (56), (57) of conventional type are mounted, includes further a pair of laterally spaced side panels (58), (59), which panels (58), (59) are open at the front (60) and the rear (61) of the cabinet such that the carriers (28) are accessible at both the front (60) and the rear (61) of the rear cabinet (22). A pair of elongated feet (62), (63) (FIGS. 1, 3 and 9) are secured to the bottom portions of the side panels (58), (59), with rollers (64) mounted on the feet (62), (63) (FIG. 9) for rotatable movement of the cabinet (22) forwardly and rearwardly on and relative to the housing tubular elements (52), (53) for servicing purposes of the cabinet (22) and the product carriers (28) mounted therein.

Figure 2:
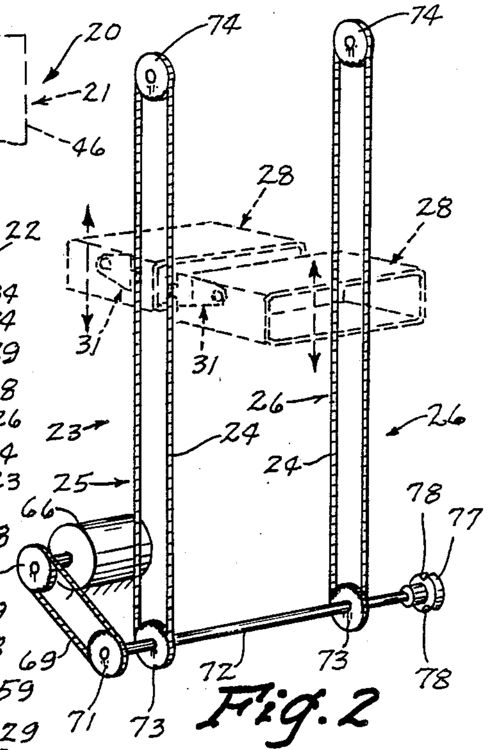
FIG. 2 is a schematic of the endless conveyor apparatus of this invention, a pair of product conveyors shown in dotted lines.

Referring particularly to FIG. 2, the conveyor assembly (23) comprises a reversible drive motor (66) mounted on a bracket (67) (FIG. 3), which bracket (67) is secured across the rear of the cabinet (22), being fastened to the rear ends of the side panels (58), (59). A drive sprocket (68) (FIG. 3) is connected to the drive motor (66) for rotating an endless chain (69) connected to a driven sprocket (71), in turn drivingly connected to a drive shaft (72) (FIGS. 1 and 2) which is inserted through openings provided therefore in the side panels (58), (59) of the cabinet (22).

A lower sprocket (73) for each conveyor chain (24) is mounted on the drive shaft (72), the lower sprocket (73) being laterally spaced as indicated in FIG. 2, with the chains (24) trained about a pair of upper sprockets (74) in comparable laterally spaced positions to the lower sprockets (73) (FIG. 2), with the upper sprocket (74) being rotatably mounted to the side panels (58), (59) of the cabinet (22).

Figure 10:
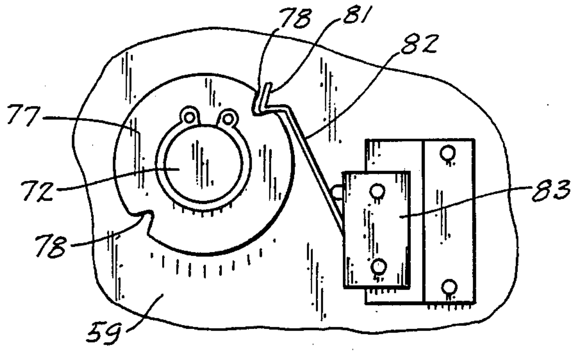
FIG. 10 is an enlarged detail view taken along the line 10—10 in FIG. 1.

A cam (77) (FIGS. 2 and 10) is secured to a free end (78) of the drive shaft (72), with one or more notches (79) formed therein for rotatable engagement by the V-shaped end (81) of a leaf connector (82) as part of a carrier micro-switch (83). The drive motor (66) and the carrier micro-switch (83) are electrically connected as by slave conduits to another machine (not shown), the latter machine including coin-operated merchandise selecting mechanisms of conventional types; whereby operation of the latter unit activates and controls the operation of the drive motor (66) and the switch (83) to ensure operation of the conveyor assembly (23) to move the product carriers (28) in succession past the dispensing station (27), and to halt such movement actively to place the product carrier (28) chosen by the customer. The conveyor assembly (23) is reversible such that the carriers (28) are selectively movable in either direction.

As is conventional, the dispensing station (27) (FIG. 3) comprises primarily a vertically slidable door element (84) formed in the door (50) of the housing (21).

Figure 6:
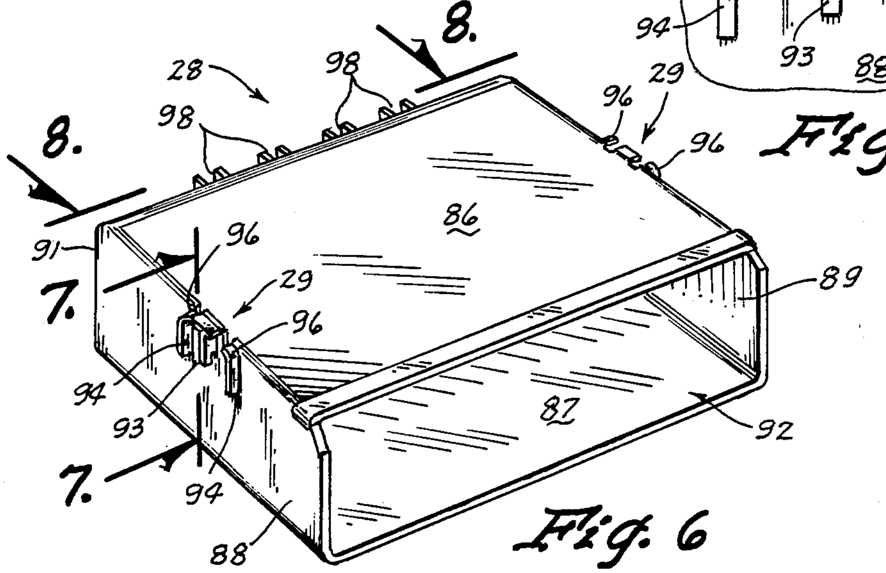
FIG. 6 is a perspective view of a carrier of this invention.

Referring to FIG. 6, each product carrier (28) is rectangular in shape, and comprises a top (86), bottom (87), side walls (88), (89) and a rear wall (91). The front (92) of the carrier (28) is open for the insertion and retrieval of product therein. As is conventional, the top (86) may be hingedly or slidably connected for loading purposes, for example, or the interior of the carrier (86) may be compartmentalized.

Each product carrier (28) includes further the support units (29) (FIGS. 6 and 7) formed on opposed side walls (88), (89) thereof; each support unit (29) comprising an outwardly extended, straight lug (93) disposed normal to the longitudinal axis of the side walls (88), (89), the usual horizontal position of each carrier (28). On opposite sides of each lug (93) are formed a pair of projections (94), each with a curved upper portion (96) for a purpose hereinafter described. A pair of longitudinally spaced notches (97) (FIG. 7) are formed in each carrier side wall (88), (89), each notch (97) being formed intermediate the lug (93) and a respective projection (94), again for purposes hereinafter described.

Figure 8:
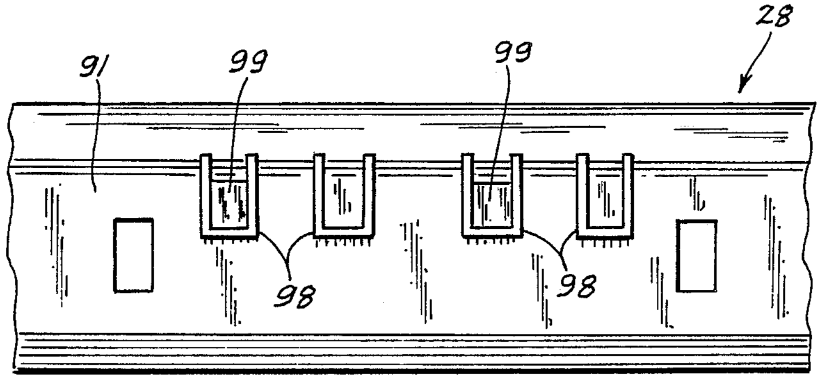
FIG. 8 is an enlarged fragmentary view of the rear of each carrier taken along the line 8—8 in FIG. 6.

The product carrier (28) includes further a product-cost identification unit in the form of U-shaped pockets (98) (FIG. 8) formed on the rear wall (91) of the carrier (28), and wherein one or more pre-programed magnetic devices (99), (101) are inserted into the pockets (98). The devices (99), (101) are programed to identify the particular cost of the product contained within a predetermined carrier (28) as described hereinafter.

To cooperate with the product identification devices (99), (101), a carrier sensing unit (102) (FIG. 3) is mounted on a bracket (103) secured to the cabinet panels (58), (59) so as to stand across the rear open end (61) of the cabinet (22), and also mounted so as to be proximate with each carrier (**28*a*) (FIG. 3), for example, as each carrier (28) is moved sequentially past the unit (102) during the operation of the conveyor assembly (23**).

The sensing unit (102) is itself programed in a conventional manner with a memory capable of interacting with each arrangement of magnetic devices (99), (101) on a carrier (**28*a*), for example, or with any other arrangement of magnetic devices interchangeably disposed in the pockets (98) of each respective carrier (28), such that upon a carrier (28*a*) moving proximate with the sensing unit (102), the cost of the product in the carrier (28*b*) (FIG. 3) in front of the rear carrier (28*a*) is read and simultaneously displayed on either the housing (21) of the instant machine (20), or on the machine (not shown) of which the instant dispensing machine (20**) is a slave.

Figure 5:
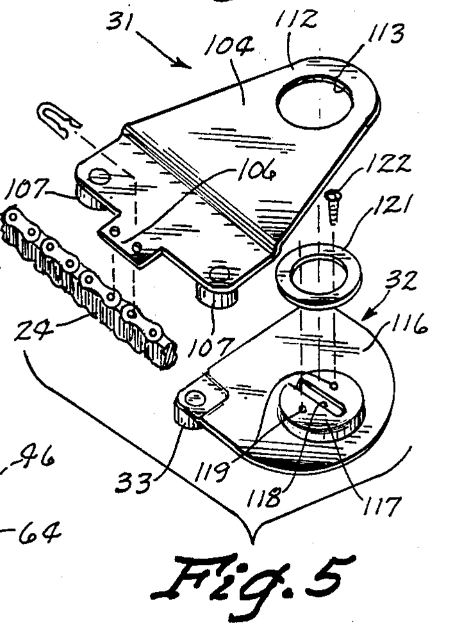
FIG. 5 is an enlarged, exploded view of carrier mounting arm and stabilizer elements of this invention.
Figure 3:
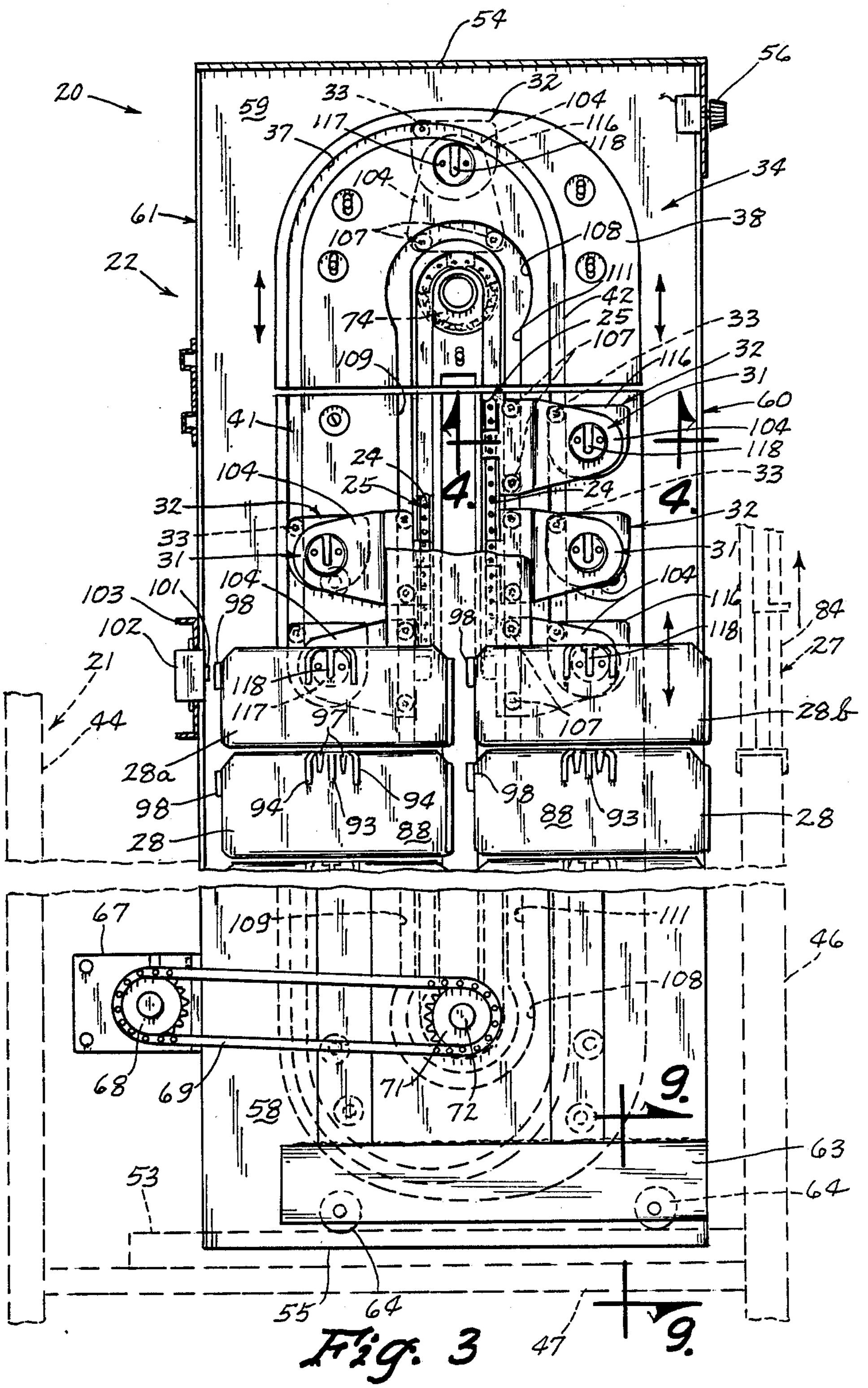
FIG. 3 is a side elevational and sectional view as taken along the line 3—3 in FIG. 1, foreshortened for clarity of the invention, and again with parts of the housing shown in dotted lines.
Figure 4:
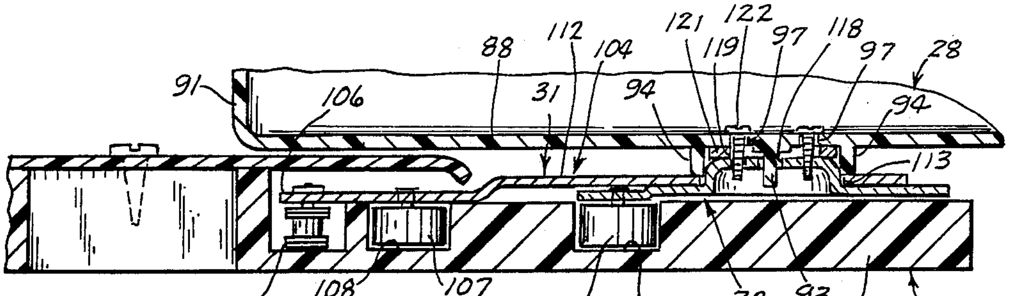
FIG. 4 is an enlarged, sectional fragmentary view taken along the line 4—4 in FIG. 3.

Referring particularly to FIGS. 3–5, the mounting units (31) each comprise a relatively flat arm (104) having a tab (106) connected to the chain (24) for movement therewith, and having further a pair of spaced rollers (107) insertable into an elliptical-type inner groove (108) (FIGS. 3 and 4), the groove (108) also having vertical stretches (109) and (111) parallel the vertical stretches (25), (26) for the conveyor chains (24), and the vertical stretches (41), (42) of the guidepaths (36), (37).

The stabilizer device (32) (FIGS. 4 and 5) comprises a relatively flat member (116) having the follower (33) rotatably mounted on one corner thereof, and having a raised boss (117) formed centrally thereof with a slot (118) formed in the boss, and with a pair of holes (119) formed each on a side of the slot (118). The holes (119) are formed on an imaginary line extended normal to the extent of the slot (118) for reasons hereinafter described. Further, a spacer (121) (FIG. 5) and a pair of screws (122) are provided for connecting the support unit (29) of each carrier (28), a mounting unit (31) and a stabilizer device (32) for supporting each carrier (28) in a normally horizontal position on the conveyor chains (24) during the entire movement of each product carrier (28) throughout an entire elliptical path. With each carrier (28) having a support unit (29)

secured in transverse alignment (FIG. 6) at each end (88), (89) of the carrier (28), the spacing between the cabinet panels (58), (50) (FIG. 1) is such that with each mounting unit and stabilizer device (32) assembled together as an assembly and secured to the track (24), the spacing of the unit (31) and device (32) assemblies on the track (24) is such that the assemblies (123) (FIG. 1) are transversely opposed. Thus, each carrier (28) can releasably be supported by the opposed assemblies (123), the opposed lugs (93) on each carrier (28) dropping into and being releasably held by the opposed slots (118) of the respective opposed stabilizer devices (32) in each assembly (123). The assemblies (123) of a mounting unit (31) with a stabilizer device (32), and releasably connected with a support unit (29) at one end of a product carrier (28) is clearly shown in FIG. 4. The projections (94) surround the sides of the boss (117).

Figure 14:
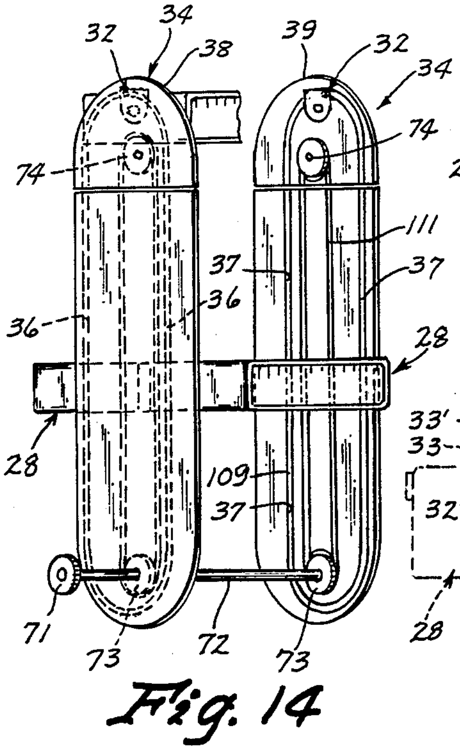
FIG. 14 is a fragmentary, perspective view of the pair of guidepath plates in spaced relation.
Figure 15:
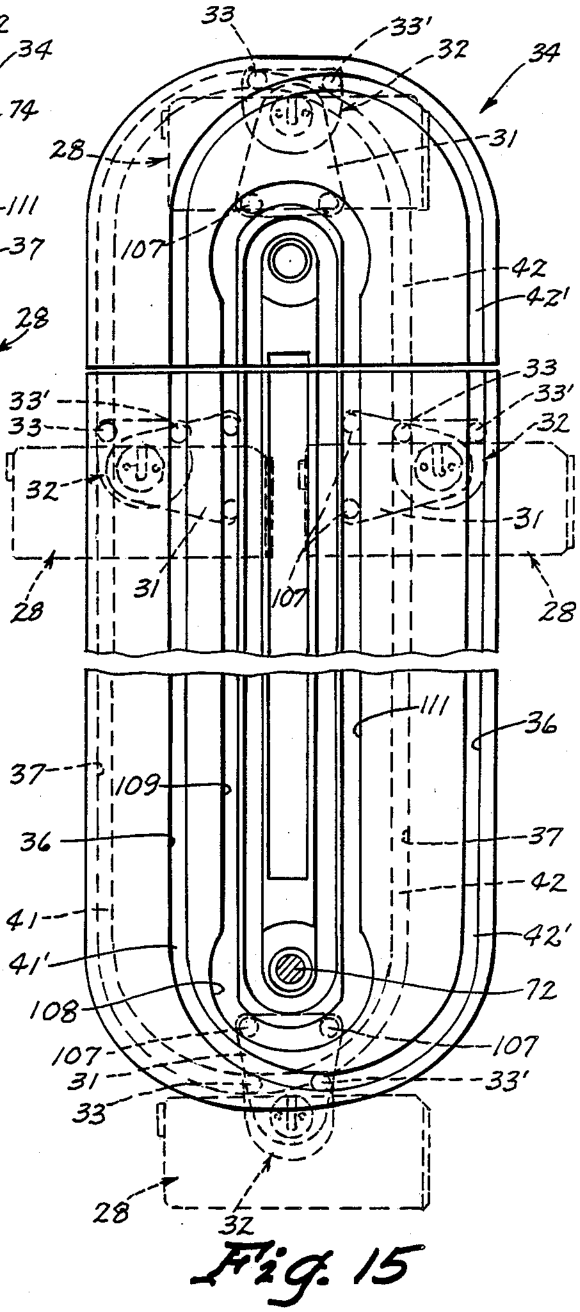
FIG. 15 is an elevational view taken from the right side of FIG. 14 such that the respective guidepaths are superimposed.

To ensure that each carrier (28) remains horizontally disposed at all locations on the guidepaths (36), (37), the guide track assembly (34) has the guidepath (36) formed in the face of the guideplate (38) horizontally offset from the guidepath (37) formed in the face of the guideplate (39) as is best shown in FIG. 14. The guideplate (38) is secured in an upright manner to the inner face of the cabinet side panel (58) (FIG. 1) and the guideplate (39) is secured in an upright manner to the inner face of the cabinet side panel (59), such that the guideplates (38), (39) and their respective, horizontally offset guidepaths (36) and (37) face each other again as best shown in FIG. 14. To further clarify the horizontal offset nature of the guidepaths (36), (37), FIG. 15 is a view looking from the right side of FIG. 14 at and through both guideplates (38), (39), such that the guidepaths (36), (37) are superimposed upon each other.

Stabilizer devices (32) (FIG. 3) mounted at the right end of each carrier (28) (FIG. 1), and the followers (33) at that end are located for travel in the respective proximate guidepath (37), whereas as one views the stabilizer devices (32) mounted at the left end of each carrier (28), the followers (33) at that end are laterally offset and located for travel in that particular guidepath (36) proximate thereto. It is thus noted from FIG. 15 that the guidepaths (36), (37) are horizontally offset a distance equal to the spacing of the respective followers (33). In this regard, the follower (33) in the guidepath (37) (FIG. 15) and the follower (33') in the guidepath (36), both followers (33) and (33') part of the support arrangement for a single carrier (28), show that the followers (33), (33') at opposed ends of each carrier (28) are in the same horizontal plane, thereby ensuring that each carrier (28) remains in the horizontal position regardless of the position of the carrier (28) on either the vertical stretches (25) of the chains (24) or at the corners thereof as the carrier moves from one vertical stretch (25), for example, to another (26). It is noted that the followers (33) and (33') for each carrier (28) continually lie in a horizontal plane throughout their entire travel.

Although not necessary to the maintenance of each carrier (28) in a horizontal position, such maintenance is aided by the screws (122) (FIG. 5) being inserted through the boss holes (119). It will be noted that with the assembly of the member (116) of each stabilizer device (32) with the arm (104) of each mounting unit (31), the raised boss (117) is rotatably inserted through the circular opening (113) such that the arm (104) rotatably embraces the member (116) via the boss (117) at all times. Further, upon assembly of the member (116) with the stabilizer device (32) at each end of a carrier (28), the two screws (122) fit downwardly within the notches (97) (FIGS. 4 and 7) of the support unit (29) thereby aiding in the prevention of a carrier (28) tilting out of the normal horizontal position. It should further be noted that the support units (29) are disposed intermediate the front and rear ends of each carrier (28) (FIG. 6) and along the top edge of each side wall (88), (89) thereof such that gravity also aids in maintaining each carrier (28) horizontally disposed.

Figure 11:
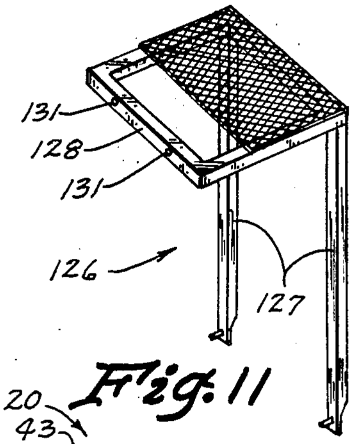
FIG. 11 is a perspective view of a cabinet support.
Figure 12:
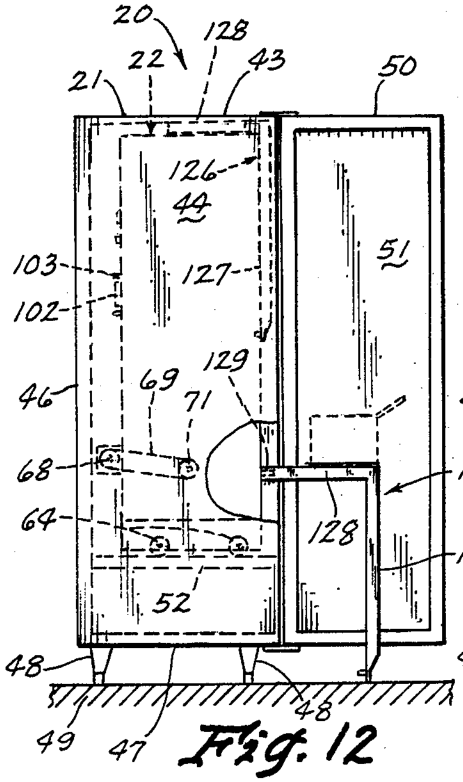
FIG. 12 is a side elevational view of the vending machine of this invention, with a front door thereof shown in an open position, and showing further alternate positions of the support table by means of dotted an full lines.

To aid in servicing the machine (20), a cabinet support table (126) (FIG. 11) is provided, which table (126) includes a pair of spaced legs (127) connected with a flat table portion (128) in an L-shaped arrangement. Laterally spaced pins (129) (FIG. 1) are formed on the front of the cabinet side panels (58), (50) such that the table (126) may be secured thereto, holes (131) (FIG. 11) being formed in one end of the table portion (128) for that purpose. Referring to FIG. 12, the position of the table (126) connected to the pins (129) via the holes (131) is shown, the legs (127) resting on the floor (49).

Figure 13:
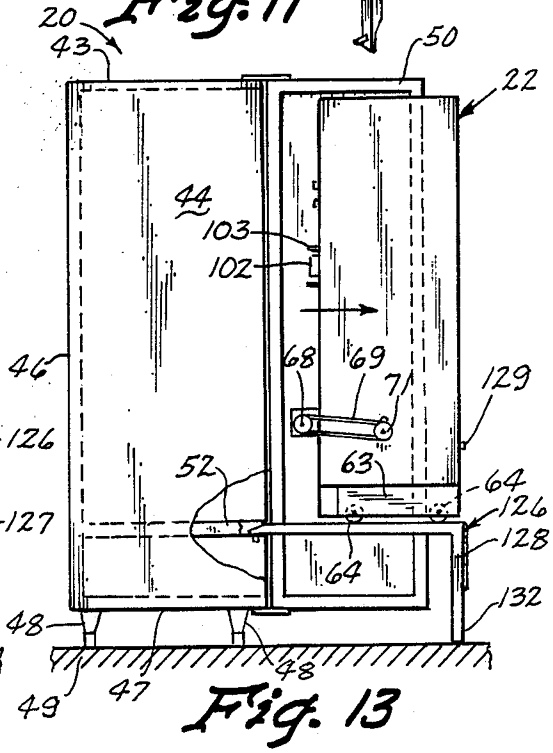
FIG. 13 is a view similar to FIG. 12, and wherein a third position of the support table relative to the cabinet is shown in full lines, with the cabinet thereof shown in a forwardly extended position.

Another position of the table (126) is shown in FIG. 13 wherein the legs (127) are spaced apart an identical distance as the tubular elements (52), (53) (FIG. 1) of the housing (21), and with the legs (127) being inserted into the open ends of the tubular elements (52), (53) to form an extension thereof, an end (132) of the table portion (126) resting on the floor (49). In this latter position of the table (126), it is seen that the cabinet (32) may be moved outwardly of the housing (21), the rollers (64) secured to the feet (62), (63) of the cabinet (22) rolling along the upper surfaces of the legs (127) in the position of FIG. 13.

When not in use, the table (126) is stored within the housing (21) as shown by dotted lines in FIG. 12, the table portion (128) resting on the top portion (54) of the cabinet (22), with the legs (127) disposed downwardly in front of the cabinet (22) such that the door (50) is closeable.

While the invention has been described with reference to a particular embodiment, with suggested modifications, changes or other modifications may also be suggested to those skilled in the art without departing from the inventive concept or scope of the appended claims.

I claim:

1. In a dispensing machine:
a cabinet;
an endless, upright conveyor mounted within said cabinet having an elliptical-type shape, said elliptical-type shape having opposed vertical stretches;
a dispensing station formed adjacent one of said vertical stretches;
a plurality of product carriers, each carrier having support devices mounted on opposed ends thereof;
means mounting said carriers on said conveyor for movement in succession past said station;
stabilizer means rotatably connected to said mounting means and including a follower secured thereon, said support devices releasably connected to said stabilizer means; and
guide track means having elliptical-type guidepaths with vertical stretches extended parallel said vertical stretches of said conveyor, said follower of each stabilizer means engaged in at least one of said guidepaths whereby said carriers are maintained in a generally horizontally disposed position for receiving and holding product.

2. The dispensing machine of claim 1, and each support device further including an outwardly extended lug disposed normal to the width of said carrier.

3. The dispensing machine of claim 1, and said mounting means including an arm connected at one end to said conveyor and having an opening formed in the other end thereof.

4. The dispensing machine of claim 3, and further wherein said stabilizer means comprises a relatively flat plate having said follower secured to one portion thereof and having a raised boss rotatably, engageably receivable within said arm opening.

5. The dispensing machine of claim 4, and including further a slot formed within said boss and adapted to receive said lug.

6. The dispensing machine of claim 5, and further wherein said slots of said bosses are held in a vertical position to receive said lugs to positively hold said carriers in horizontally disposed positions.

7. The dispensing machine of claim 6, and said elliptical-type guidepaths comprising a pair of guidepaths, a first guidepath formed on one side of said cabinet and a second guidepath formed on an opposite side of said cabinet, said guidepaths horizontally offset from each other in superimposed view whereby said guidepath vertical stretches are horizontally spaced apart.

8. The dispensing machine of claim 7, and further wherein said support devices are mounted on opposite ends of each carrier with respective followers offset a like distance to said horizontal spacing of said guidepath vertical stretches, such that said support devices thereby maintain each said slot in a vertically disposed position to receive each said lug.

9. The dispensing machine of claim 1, and further wherein carrier sensing means are mounted on said cabinet, and cost identification means are mounted on each carrier, said conveyor operable to move each carrier into a position proximate with said sensing means, said sensing means capable of sensing said product identification means of each carrier as each carrier is moved into proximity with said sensing means, said sensing means operable for displaying the cost of the product within a carrier located at the dispensing station.

10. The dispensing machine of claim 9, and further wherein said cost identification means is interchangeable on each carrier, whereby each carrier is not limited to specific prices as to the product carried therein.

11. The dispensing machine of claim 10, and further wherein said cost identification means comprises one or more pockets formed on each carrier for holding one or more magnetic devices, each device programmed to identify the particular cost of the product contained within the respective carrier.

12. The dispensing machine of claim 11, and further wherein said sensing means includes a memory device capable of interacting with each said magnetic device on each carrier to selectively display the price of the product being carried by one carrier at the station as another carrier moves proximate said sensing means.

13. The dispensing machine of claim 1, and further wherein a housing is provided for said cabinet, said housing, said cabinet having pin means formed on the front thereof, tubular elements mounted in the bottom of said housing, said cabinet rollably mounted on said tubular elements, and cabinet support means movable from a first position stored above said cabinet to a second position mounted on said pin means and supported on a floor for holding a said carrier.

14. The dispensing machine of claim 13, and further wherein said cabinet support means includes a pair of L-shaped members insertable into said elements for forming floor engaging extension of said cabinet support means, whereby said cabinet is rollable outwardly of said housing onto said cabinet support means.

* * * * *